(12) United States Patent  (10) Patent No.: US 9,225,202 B1
Kim et al.  (45) Date of Patent: Dec. 29, 2015

(54) AC POWER CONTROL FOR A POWER SUPPLY SYSTEM DURING AC LINE DISTURBANCE

(75) Inventors: Sangsun Kim, San Jose, CA (US); Neilus O'Sullivan, Mountain View, CA (US)

(73) Assignee: Google Inc., Mountain View, CA (US)

( * ) Notice: Subject to any disclaimer, the term of this patent is extended or adjusted under 35 U.S.C. 154(b) by 709 days.

(21) Appl. No.: 13/463,701

(22) Filed: May 3, 2012

(51) Int. Cl.
*H02J 7/00* (2006.01)
*H02J 9/00* (2006.01)
*H02J 9/06* (2006.01)

(52) U.S. Cl.
CPC *H02J 9/061* (2013.01); *H02J 9/062* (2013.01)

(58) Field of Classification Search
CPC .............. H02J 9/062; H02J 9/061; H02J 9/06
USPC ......................................................... 307/66
See application file for complete search history.

(56) References Cited

U.S. PATENT DOCUMENTS

| | | | |
|---|---|---|---|
| 5,289,046 A | 2/1994 | Gregorich et al. | |
| 5,638,265 A | 6/1997 | Gabor | |
| 5,920,129 A | 7/1999 | Smith | |
| 6,605,879 B2 | 8/2003 | Wade et al. | |
| 7,394,674 B2 | 7/2008 | Huang | |
| 7,547,990 B2* | 6/2009 | Varzhabedian | 307/66 |
| 7,715,215 B1 | 5/2010 | Bosco et al. | |
| 7,886,173 B2* | 2/2011 | Krieger et al. | 713/330 |
| 2003/0090348 A1* | 5/2003 | Simms | 335/6 |
| 2005/0057878 A1* | 3/2005 | Serrano et al. | 361/115 |
| 2006/0050465 A1 | 3/2006 | Cho et al. | |

\* cited by examiner

*Primary Examiner* — Jared Fureman
*Assistant Examiner* — Esayas Yeshaw
(74) *Attorney, Agent, or Firm* — Fish & Richardson P.C.

(57) ABSTRACT

System for providing AC power control is disclosed. The system includes a primary power source (e.g., AC power source or backup generator power source), a backup power source (e.g., battery in power supply unit), and a control component. The control component powers the load with the primary power source when output voltage of the primary power source is above a predetermined threshold. The control component is configured to power the load concurrently with both the primary power and the backup power if the output voltage of the primary power source falls below a predetermined threshold. The control component is also configured to disable the primary power source and power the load with only the backup power source, upon detection of a fault condition at the primary power source. Upon resolution of the fault condition, the primary power is ramped up and the backup power is simultaneous ramped down.

19 Claims, 12 Drawing Sheets

AC POWER CONTROL FOR A POWER SUPPLY SYSTEM DURING AC LINE DISTURBANCE

TECHNICAL FIELD

The subject disclosure relates to power supply systems and more particularly to providing alternating current (AC) power control in a power supply system.

BACKGROUND

Backup power sources provide power to a load during loss of a primary power source. Often times, backup power is provided by batteries or battery packs. Backup power is used in various applications where continuous power is needed, for example, to protect electrical systems from corruption and/or loss of data upon failure of a primary power source. Normally, a primary power source supplies power to the load and also charges the backup batteries (or battery packs) simultaneously. During loss, malfunction or non-operation of a primary power source, the batteries (or battery packs) supply power to the load. For example, a system may experience temporary primary power loss when it is in the process of switching its primary power source from an AC utility line to a backup power generator, or vice versa. This can happen when, for example, voltage supplied by the AC utility line falls below a specified level for some time and then returns to normalcy. It would take some period of time for the backup generator to replace the AC utility line as the primary power source and to raise its output level to sufficiently power the load, during which transition period the backup power source powers the load. Likewise, it would take some time for the AC utility line to replace the backup generator to once again become the primary power source, during which transition period the backup power source powers the load.

A problem with conventional power systems and methods is that when a primary power source (e.g. AC utility line or backup generator) is restored to normalcy, it tries to suddenly step up from providing zero power to providing much heavier power demanded by the load. The primary power converter coupled to the primary power source may not be configured to manage such a sudden and significant load change and may fail to supply power to the load during the transient period. Another problem with conventional power systems and methods is that backup power usage is not properly managed, which causes unnecessary drainage of batteries (or battery packs).

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system is configured to provide alternating current (AC) power control. The system includes a primary power source, a backup power source, and a control component. For example, the primary power source includes an AC power source or a backup generator power source, and the backup power source is powered by one or more batteries (or one or more battery packs). The primary power source is configured to provide power to a load. The backup power source is also configured to provide power to the load. The control component is configured to power the load with the primary power source if output voltage of the primary power source is above a predetermined threshold. The control component is also configured to power the load concurrently with both the primary power source and the backup power source if the output voltage of the primary power source falls below the predetermined threshold.

In accordance with another implementation, a system is configured to provide AC power control and ramping control. The system includes a primary power source, a backup power source, a control component and a ramp control component. The primary power source is configured to provide power to a load. The backup power source is also configured to provide power to the load. The control component is configured to power the load with the primary power. The control component is also configured to disable the primary power source and power the load with the backup power upon detection of a fault condition at the primary power source. Upon resolution of the fault condition, the ramp control component is configured to ramp up the power provided by the primary power source and simultaneously ramp down the power provided by the backup power source.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
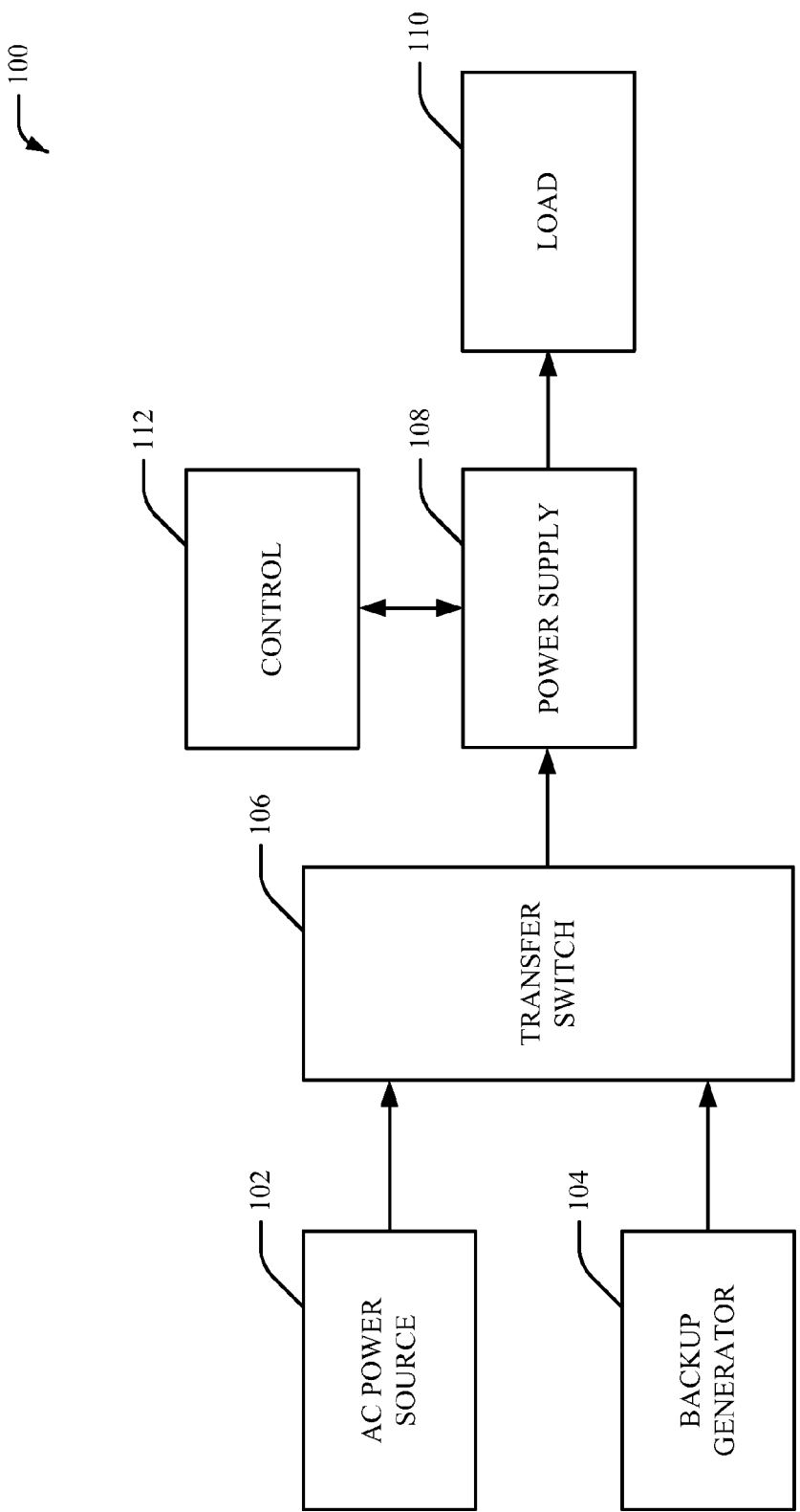
FIG. 1 illustrates a block diagram of an exemplary non-limiting power source system that provides alternating current power control.

Various aspects or features of this disclosure are described with reference to the drawings, wherein like reference numerals are used to refer to like elements throughout. In this specification, numerous specific details are set forth in order to provide a thorough understanding of the subject disclosure. It should be understood, however, that the certain aspects of disclosure may be practiced without these specific details, or with other methods, components, materials, etc. In other instances, well-known structures and devices are shown in block diagram form to facilitate describing the subject disclosure.

According to an aspect of the subject disclosure, systems and methods disclosed herein provide alternating current (AC) power control for a power supply system during AC line disturbances. The power supply system includes one or more converter components coupled to a primary power source and one or more loads. Additionally, the power supply system includes a backup power source (e.g., one or more batteries) coupled to the load(s) in parallel with the one or more converter components. Furthermore, the power supply system includes a control component coupled to the one or more converter components and the backup power source.

The control component monitors a voltage level (e.g., a root mean square (RMS) voltage level) provided by the primary power source. If the voltage level provided by the primary power source is within a predetermined voltage range (e.g., a sufficient voltage range for the one or more loads), then the control component configures the one or more converter components to provide the one or more loads with power from the primary power source. However, if the voltage level provided by the primary power source is not within the predetermined voltage range, e.g. below a predetermined threshold, then the control component configures the one or more converter components and the backup power source (e.g., the one or more batteries) to concurrently provide the one or more loads with power. As such, the amount of load power provided by the one or more batteries is reduced (e.g., the one or more batteries deliver a minimized amount of power by providing only the portion of the power not provided by the primary source converters). Therefore, the one or more batteries deliver lighter load power. Furthermore, the primary power source is restored without a significant load step (e.g., a significant load step does not appear on the primary power converter's output signal when the primary power source returns within the predetermined threshold). As such, soft ramping control is not necessary. Additionally, the backup power source is immediately disabled, and the primary power source resumes providing power to the load.

Additionally or alternatively, if the voltage level provided by the primary power source falls below a threshold voltage level, thereby indicating a fault condition at the AC power source, then the control component configures the backup power source to exclusively provide the one or more loads with power. As such, the control component provides AC power control based on voltage levels of the primary power source. In addition, when the voltage level provided by the primary power source returns to within the predetermined voltage range, the control component provides ramp up control for the power output of the one or more converter components of the AC power source and/or ramp down control for the power output of the backup power source when functionality of the primary power source returns. Furthermore, to avoid a fault condition, the output power of the primary power source is ramped up slowly.

Referring initially to FIG. 1, there is illustrated an example system 100 that provides AC power control in a power supply system, according to an aspect of the subject disclosure. Specifically, the system 100 provides a control feature that can be utilized in most any power supply application, for example, by controlling the amount of power supplied to a load from a primary power source and a backup power source. The system 100 can be employed by various systems, such as, but not limited to, data center systems, network systems, computer network systems, communication systems, router systems, data center systems, server systems, high availability server systems (e.g., Telecom server systems), Web server systems, file server systems, media server systems, disk arrays, powered insertion boards, and the like.

In particular, the system 100 includes an AC power source (e.g., an AC utility line) 102, a backup generator 104, a transfer switch 106, a power supply 108, a load 110 and a control component (e.g., a controller) 112. In one example, the AC power source 102 is a single phase AC power source. In another example, the AC power source 102 is a single phase from a three-phase AC power source. The AC power source 102 is configured to provide power to the load 110. In one example, the backup generator 104 is implemented as an AC backup generator. The backup generator 104 is configured to supply power to the load 110 when the AC power source 102 is unavailable (e.g., during a power failure). Therefore, the AC power source 102 and/or the backup generator 104 are implemented as a primary power source. Additionally, the power supply 108 includes a backup power source (e.g., a battery and a battery converter). For example, the backup power source in the power supply 108 can be powered by one or more batteries (or one or more battery packs). As such, the power supply 108 is implemented as an uninterrupted power supply. It is to be appreciated that a battery, batteries, a battery pack and battery packs are used interchangeably throughout the subject disclosure.

In one example, the transfer switch 106 is implemented as a relay. For example, the transfer switch 106 can be implemented as a single pole double throw (SPDT) relay switch. In another example, the transfer switch 106 is implemented as a semiconductor power switch. The transfer switch 106 is toggled based on whether the primary power source (e.g., the AC power source 102) is able to provide sufficient power to the load 110 or not. For example, the transfer switch 106 is toggled to decouple the AC power source 102 from the load 110 and couple the backup generator 104 to the load 110 in response to a determination that the AC power source 102 (AC utility line) is not able to provide sufficient AC power to the load 110. In another example, the transfer switch 106 is toggled to couple the AC power source 102 to the load 110 and decouple the backup generator 104 from the load 110 in response to a determination that the AC power source 102 is able to provide sufficient AC power to the load 110.

However, a time delay can exist when the source of power for the load 110 is switched from the AC power source 102 to the backup generator 104 (e.g., when the transfer switch 106 toggles between the AC power source 102 and the backup generator 104). For example, the backup generator 104 can be non-operational for certain amount of time (e.g., 30 seconds) before providing sufficient power to the load 110. Therefore, the power supply 108 is configured to provide power to the load 110 until the backup generator 104 is able to provide sufficient power to the load 110. It is to be appreciated that the amount of time delay that exists depends on the particular implementation of the system 100. Therefore, the amount of time delay that exists can be varied.

The control component 112 is configured to control the power provided to the load 110 based on the output voltage (e.g., RMS voltage level) of the AC power source 102 and/or the backup generator 104 (e.g., the primary power source). For example, the control component is configured to power the load 110 with power from either the AC power source 102 or the backup generator 104 if the output voltage of the AC power source 102 or the backup generator 104 is within a predetermined range. The control component 112 is also configured to power the load 110 concurrently with both a primary power source (e.g., the AC power source 102 or the backup generator 104) and a backup power source (e.g., a battery in the power supply 108) if the output voltage of the primary power source is not within (e.g., outside) the predetermined range (e.g., during a time delay, during a power failure, etc.). Therefore, the backup power source provides a portion of power to the load 110 not provided by the primary power source. Additionally, the backup power source is immediately disabled when the output voltage of the primary power source returns within the predetermined range. In one example, the control component 112 increases current provided by the primary power source and/or the backup power source in response to a drop in the voltage level of the primary power source to maintain power provided to the load 110 (e.g., if the output voltage of the primary power source is not within the predetermined range). As such, the control component 112 provides AC power control for the system 100.

Figure 2:
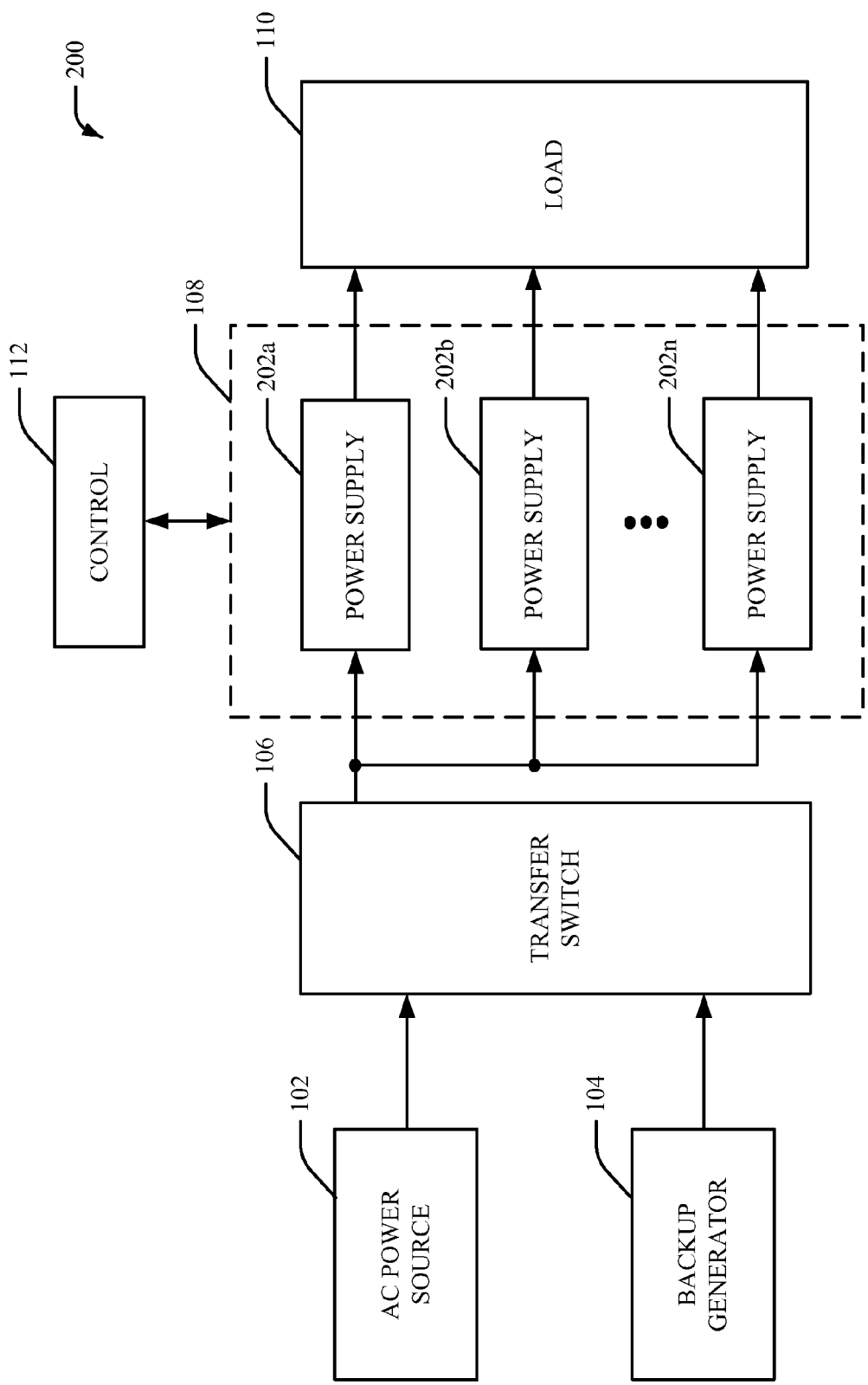
FIG. 2 illustrates a block diagram of an exemplary non-limiting power source system with one or more power supplies that provides alternating current power control.

Referring to FIG. 2, there is illustrated a non-limiting implementation of a system 200 with one or more power supplies. The system 200 includes the AC power source (e.g., the AC power supply) 102, the backup generator 104, the transfer switch 106, the power supply 108, the load 110 and the control component 112. The power supply 108 includes one or more power supplies 202a-n. The power supplies 202a-n are coupled (e.g., connected, attached) in parallel. In one example, the power supplies 202a-n can be implemented as 100 power supplies. In another example, the power supplies 202a-n can be implemented as 10,000 power supplies. However, it is to be appreciated that the number of power supplies 202a-n can be varied to meet the design criteria of a particular implementation. For example, the number of power supplies 202a-n can correspond to the number of loads in the system 200.

Each of the power supplies 202a-n are coupled to the transfer switch 106. Therefore, each of the power supplies 202a-n receive power from the primary power source (e.g., the AC power source 102 or the backup generator 104). Additionally, each of the power supplies 202a-n are coupled to the load 110. Therefore, the power supplies 202a-n are implemented with a shared output. The power supplies 202a-n are each configured to provide power to the load 110 from a primary power source (e.g., the AC power source 102 or the backup generator 104) and/or a backup power source (e.g., a battery). The control component 112 controls whether the primary power source, the backup power source, or both the primary power source and the backup source provide power to the load 110. In one example, the control component 112 is implemented as a component separate from the power supply 108. In another example, power supply 108 includes the control component 112. Therefore, a single controller (e.g., the control component 112) can control each of the power supplies 202a-n. In yet another example, each of the power supplies 202a-n include a control component 112. Therefore, each of the power supplies 202a-n can be independently controlled by a unique controller (e.g., control component 112).

Figure 3:
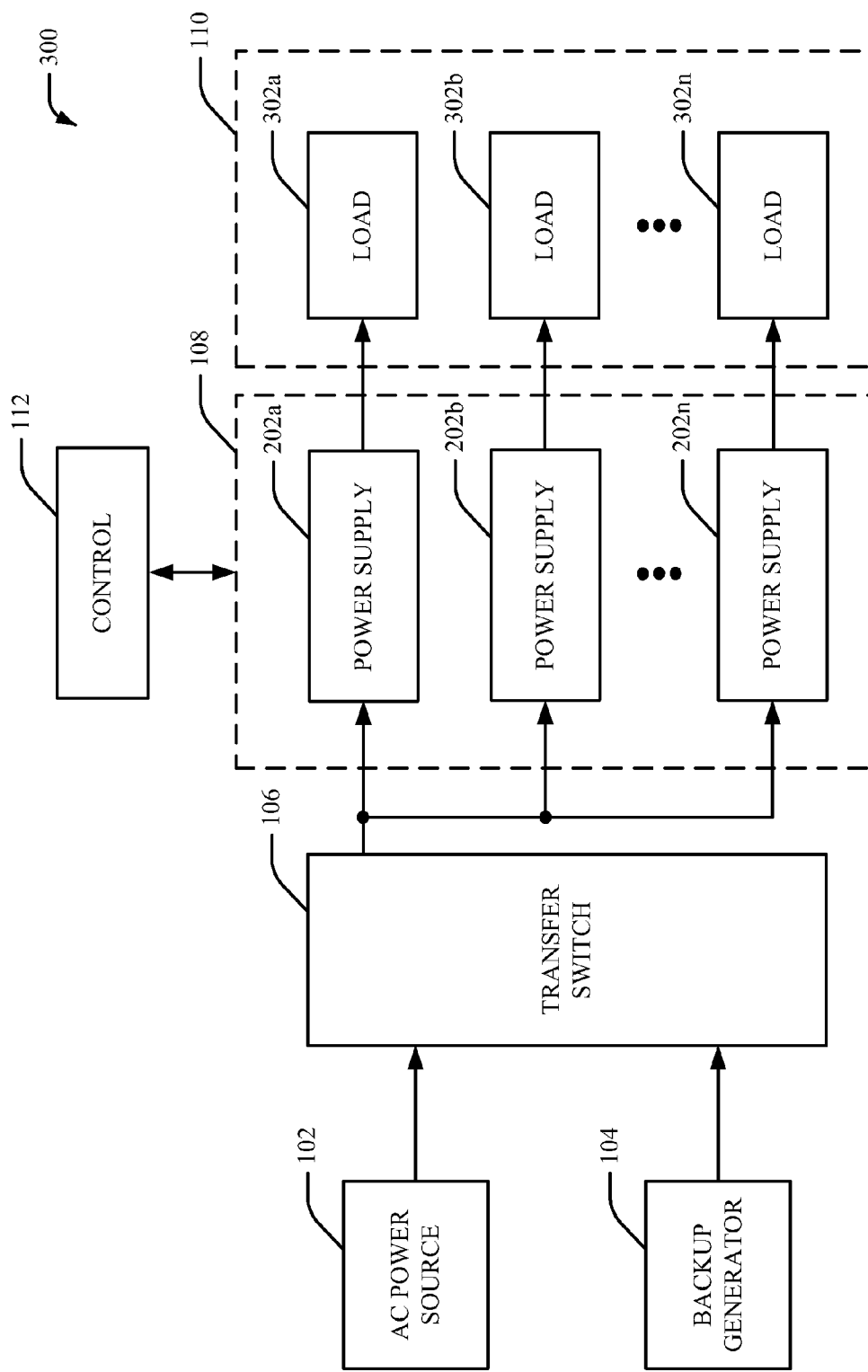
FIG. 3 illustrates a block diagram of an exemplary non-limiting power source system with one or more loads that provides alternating current power control.

Referring now to FIG. 3, there is illustrated a non-limiting implementation of a system 300 with one or more loads. The system 300 includes the AC power source (e.g., the AC power supply) 102, the backup generator 104, the transfer switch 106, the power supplies 202a-n, the load 110 and the control component 112. The load 110 includes one or more loads 302a-n. The loads 302a-n are each coupled to a respective power supply 202a-n. Therefore, the number of loads 302a-n correspond to the number of power supplies 202a-n. As such, the loads 302a-n are each configured as a stand alone unit. The loads 302a-n include server loads and/or non-server loads. For example, the loads 302a-n can include, but is not limited to, one or more switches, one or more routers, one or cooling fans and/or one or more other network devices. However, it is to be appreciated that the loads 302a-n can include most any electrical circuit(s), which in turn can include components and circuitry elements of any suitable values, in order to practice the implementations of the subject innovation.

Figure 4:
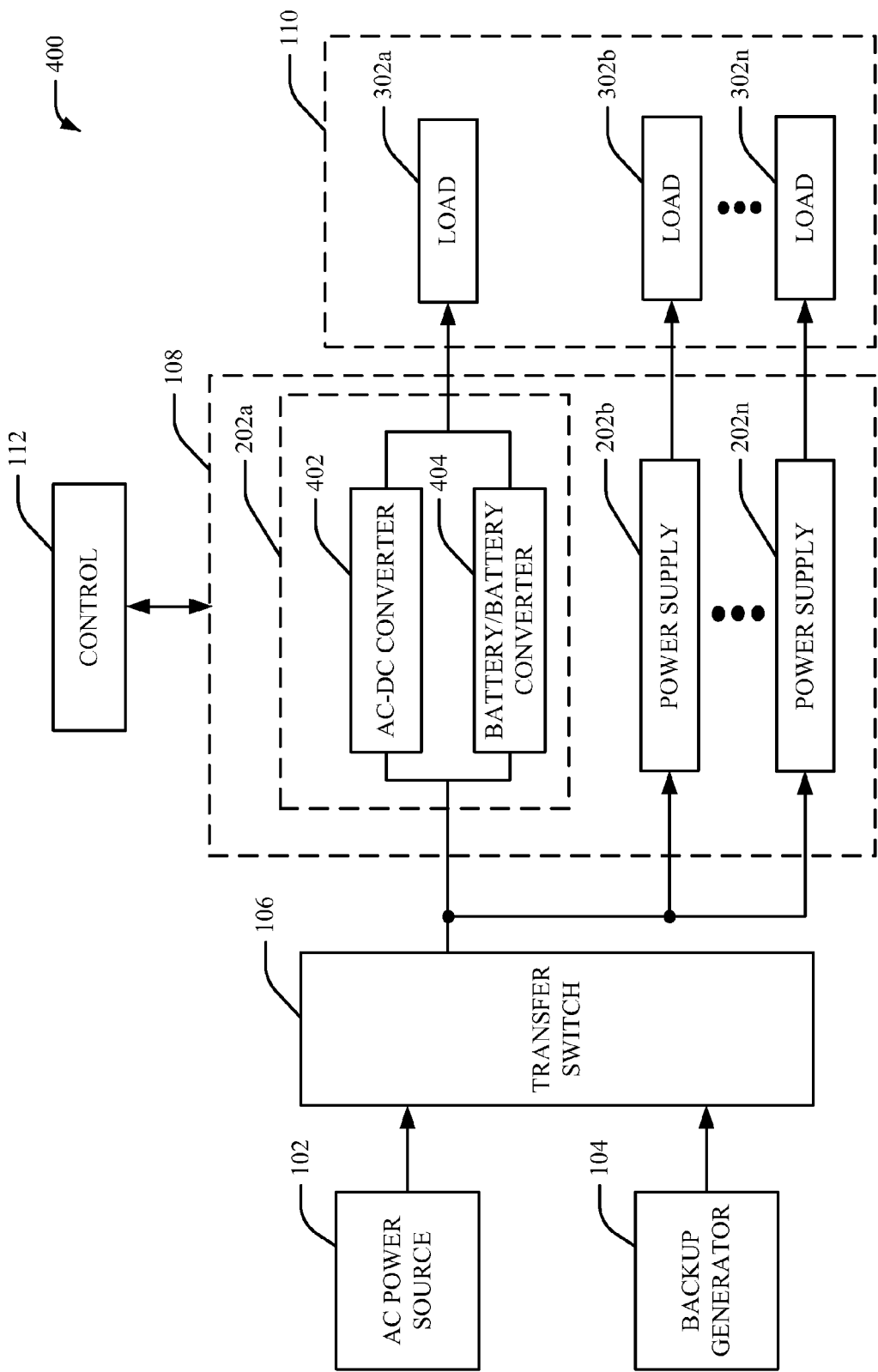
FIG. 4 illustrates a block diagram of an exemplary non-limiting power source system with a converter component and a battery that provides alternating current power control.

Referring now to FIG. 4, there is illustrated a non-limiting implementation of a system 400 with a converter component and a battery. The system 400 includes the AC power source (e.g., the AC power supply) 102, the backup generator 104, the transfer switch 106, the power supplies 202a-n, the load 110 (e.g., the loads 302a-n) and the control component 112. The power supplies 202a-n each include an alternating current-direct current (AC-DC) converter 402 and a battery (e.g., a battery and battery converter) 404. It is to be appreciated that the battery 404 can be implemented with a battery converter (e.g., an AC-DC converter) to provide a backup power source to the load 110 (e.g., the loads 302a-n). Therefore, reference to a battery 404 throughout this disclosure can also be considered as a battery and battery converter 404. The AC-DC converter 402 and/or the battery 404 are controlled by the control component 112. The control component 112 controls whether the AC-DC converter 402 exclusively provides power to the load 110 (e.g., the loads 302a-n), the battery 404 exclusively provides power to the load 110 (e.g., the loads 302a-n), or both the AC-DC converter 402 and the battery 404 concurrently provide power to the load 110 (e.g., the loads 302a-n). For example, the control component 112 controls the AC-DC converter 402 and/or the battery 404 based on a voltage level provided by the primary power source (e.g., the AC power source 102 or the backup generator 104). Therefore, if the voltage level of the primary power source is within a predetermined range (e.g., within a predetermined voltage range, a specified range, an operational range, etc.), then the AC-DC converter 402 provides power from the primary power source to the load 110.

However, if the voltage level of the primary power source is not within the predetermined range (e.g., lower than a lower threshold level of the predetermined range), then the AC-DC converter 402 and the battery 404 concurrently provides power to the load 110. For example, the AC-DC converter 402 can provide a portion of power from the primary power source (e.g., the AC power source 102 or the backup generator 104)

to the load 110 and the battery 404 can provide a remaining portion of power to the load 110. Therefore, the amount of power provided by the battery 404 is varied based on the power provided by the AC-DC converter 402 (e.g., the primary power source). As such, the power provided by the AC-DC converter 402 is limited by the line current of the primary power source (e.g., the maximum allowable AC line current provided by the primary power source).

Figure 5:
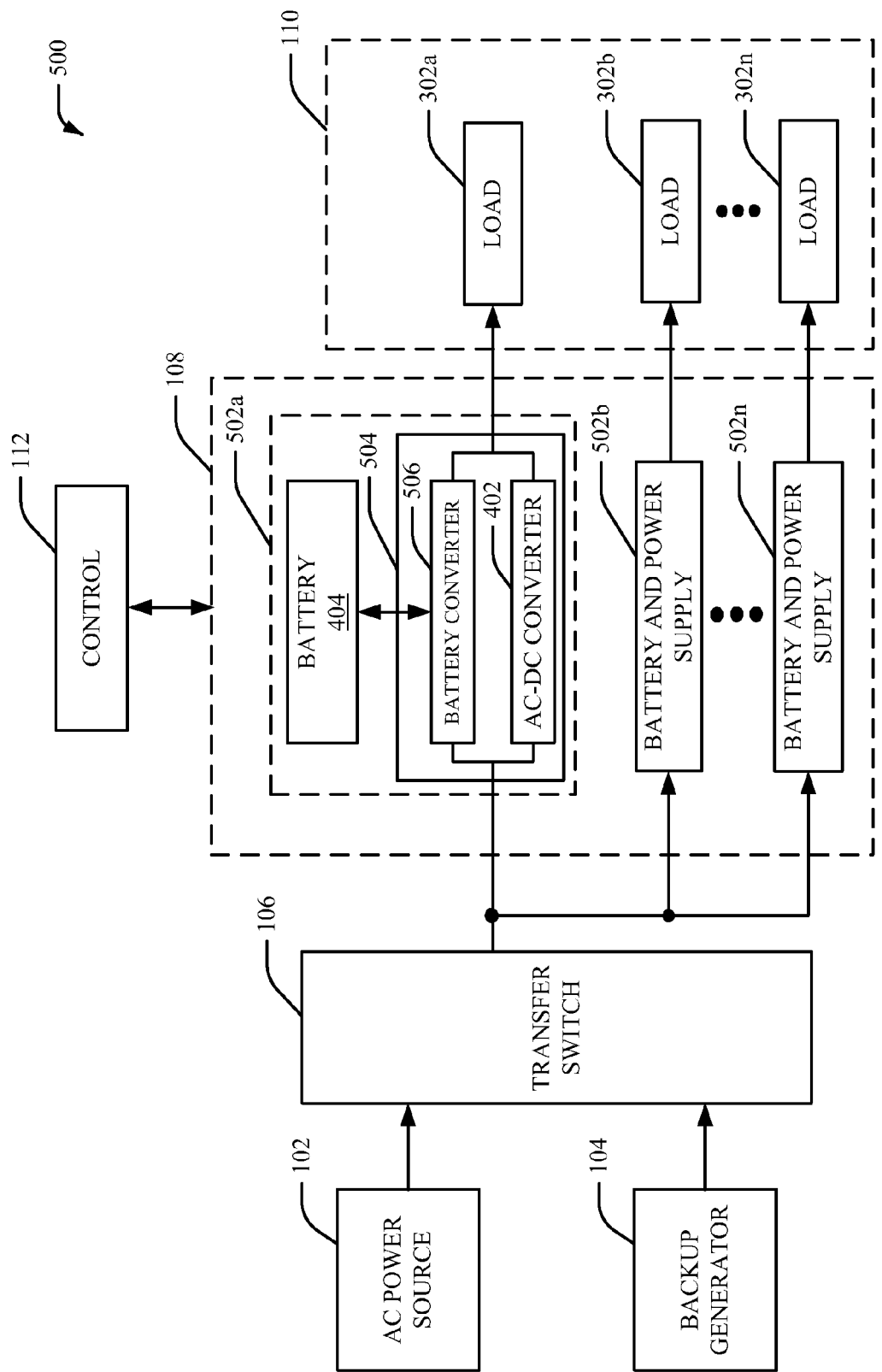
FIG. 5 illustrates a block diagram of another exemplary non-limiting power source system with a converter component and a battery that provides alternating current power control.

Referring to FIG. 5, there is illustrated another non-limiting implementation of a system 500 with a converter component and a battery. The system 500 includes the AC power source (e.g., the AC power supply) 102, the backup generator 104, the transfer switch 106, the power supply 108, the load 110 (e.g., the loads 302a-n) and the control component 112. The power supply 108 includes one or more battery and power supply components 502a-n. Each of the battery and power supply components 502a-n include the battery 404 and a power supply 504. The power supply 504 includes the AC-DC converter 402 and a battery converter 506. In one example, the battery converter 506 is implemented as a DC-DC converter.

In another non-limiting implementation, the power supply 108 includes a battery 404 (e.g., a single battery) coupled to all of the battery and power supply components 502a-n. Therefore, the power supply 504 in each of the battery and power supply components 502a-n is configured to provide the loads 302a-n with a primary power source from the AC power source 102 or the backup generator 104 and/or a backup power source from the battery 404. As such, the battery 404 (e.g., the backup power source) can be implemented as a component separate from the battery converter 506 (e.g., separate from the power supply 504) to provide a backup power source to the loads 302a-n.

Figure 6:
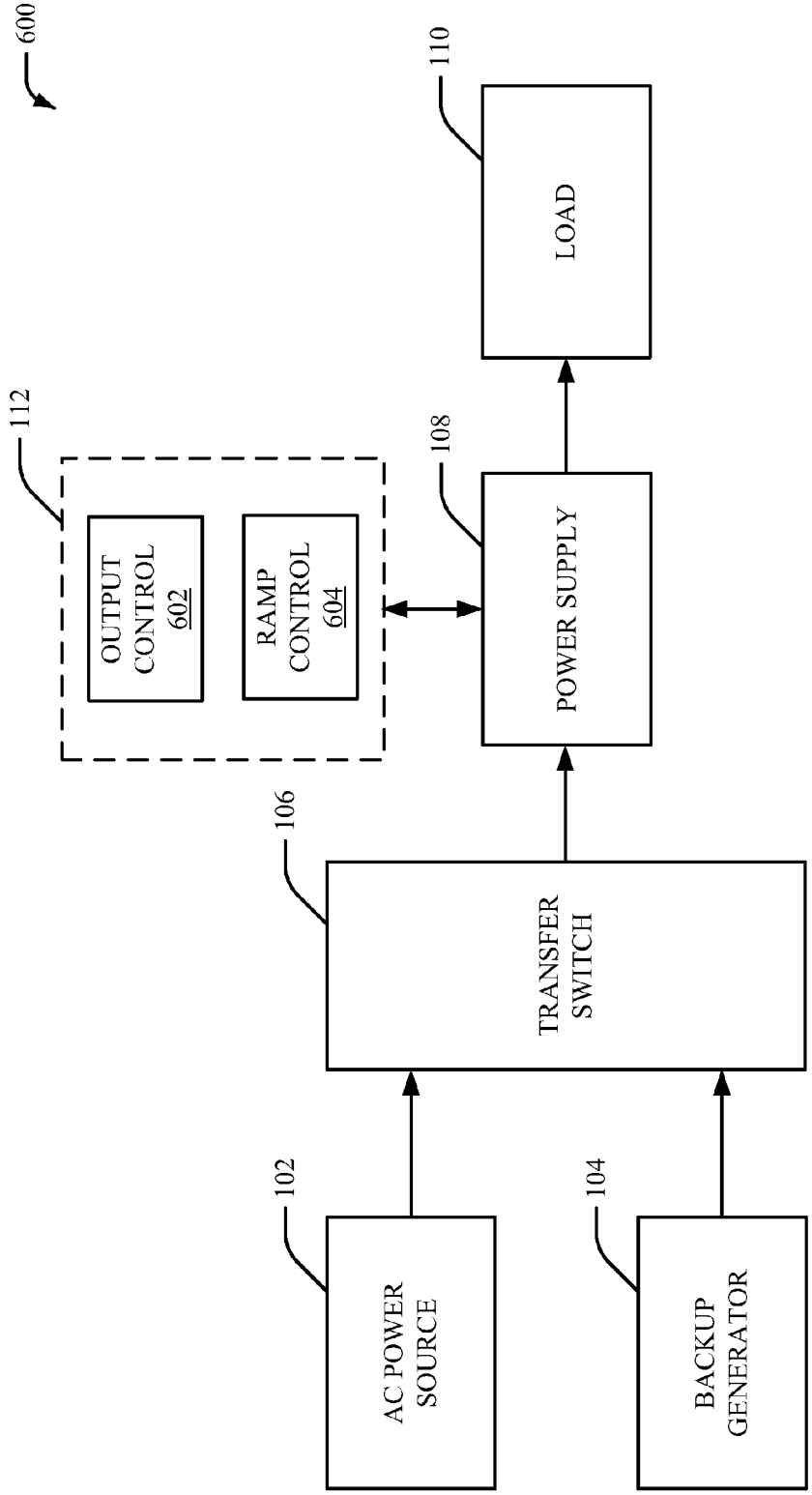
FIG. 6 illustrates a block diagram of an exemplary non-limiting power source system with an output control component and a ramp control component.

Referring now to FIG. 6, there is illustrated a non-limiting implementation of a system 600 with an output control component and a ramp control component. The system 600 includes the AC power source (e.g., a utility line coupled to an AC power supply) 102, the backup generator 104, the transfer switch 106, the power supply 108, the load 110 and the control component 112. The control component 112 includes an output control component 602 and a ramp control component 604. The output control component 602 controls the amount of power provided by the AC-DC converter 402 and the battery 404. For example, the output control component 602 determines and/or controls how much power, voltage and/or current (e.g., an amount of power, voltage and/or current) the AC-DC converter 402 and/or the battery 404 provides to the load 110 based on a voltage level (e.g., a RMS voltage level) of the primary power source. In one example, the output control component 602 increases current provided by the AC-DC converter 402 and/or the battery 404 in response to a drop in the voltage level of the primary power source to maintain power provided to the load 110 (e.g., provide a constant level of power to the load 110). For example, the output control component 602 is configured to increase current provided by the AC-DC converter 402 and/or the battery 404 if the output voltage of the primary power source is not within a predetermined range (e.g., below a predetermined threshold). Additionally, the output control component 602 determines whether the voltage level of the primary power source is within the predetermined range. Furthermore, the output control component 602 determines whether the voltage level of the primary power source is above or below a threshold voltage level (e.g., a critical voltage level) lower than the predetermined range.

The ramp control component 604 controls a ramp up rate of voltage provided by the AC-DC converter 402 and/or a ramp down rate of voltage provided by the battery 404 when functionality of the primary power source returns after being non-operational (e.g., after the resolution of the fault condition at the primary power source). For example, the ramp control component 604 can ramp up the rate of voltage provided by the AC-DC converter 402 at a rate inversely proportional to a ramp down rate of voltage provided by the battery 404. In another example, the ramp control component 604 can ramp down the rate of voltage provided by the battery 404 at a rate inversely proportional to a rate of voltage provided by the AC-DC converter 402. The ramp up rate of voltage provided by the AC-DC converter 402 and/or the ramp down rate of voltage provided by the battery 404 is controlled until power provided by the primary power source returns to a normal level (e.g., a normal operating level, a full power level, a level within the predetermined range, etc.). For example, to avoid a fault condition, the ramp control component 604 ramps up the output power of the primary power source slowly. Upon the return of the primary power to the normal level, the battery 404 is effectively disabled.

Figure 7:
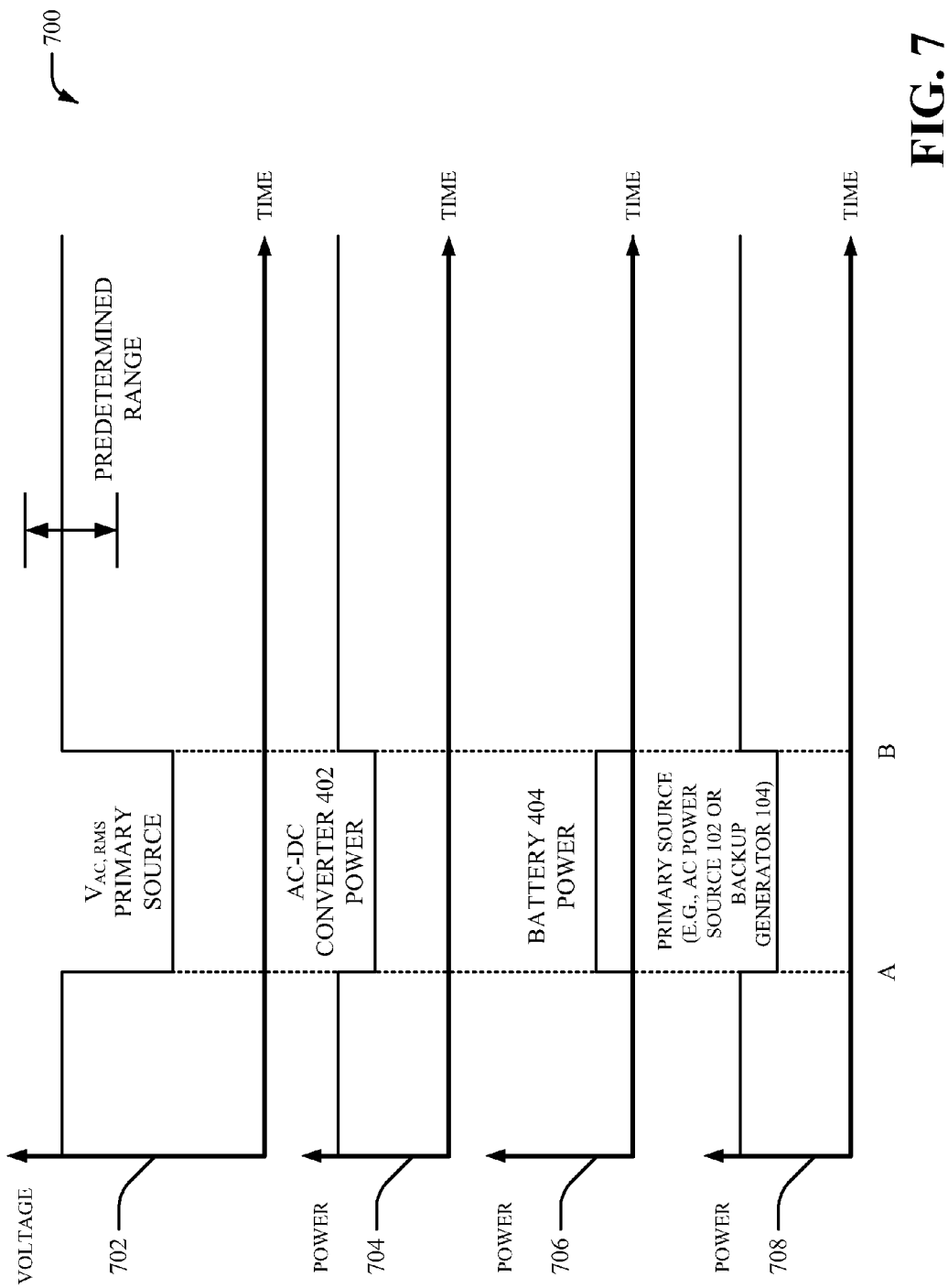
FIG. 7 illustrates a non-limiting waveform for a power source system that provides alternating current power control.

Referring to FIG. 7, there is illustrated a non-limiting waveform 700 for a system with AC power control. The waveform 700 includes a waveform 702, a waveform 704, a waveform 706 and a waveform 708. The waveform 702 illustrates a voltage level (e.g., RMS voltage level) provided by the primary power source (e.g., the AC power source 102 or the backup generator 104). The waveform 704 illustrates a power level provided by the AC-DC converter 402. The waveform 706 illustrates a power level provided by the battery 404. The waveform 708 illustrates a power level provided by the primary power source (e.g., the AC power source 102 or the backup generator 104).

The control component 112 controls the AC-DC converter 402 and the battery 404. Before time A, the voltage provided by the primary power source is within the predetermined range. Therefore, the primary power source (e.g., the AC power source 102) provides power the load 110. In one example, the predetermined range is an operational AC voltage range of the power supply 108. In another example, the predetermined range is a sufficient voltage level for the load 110 (e.g., the loads 302a-n). For example, the predetermined range can be a voltage range of 180V-240V. However, it is to be appreciated that the predetermined range can be any voltage or current range. At time A, the voltage provided by the primary power source drops below the lower threshold of the predetermined range. For example, the voltage provided by the primary power source can drop below 180V. Therefore, at time A, the AC-DC converter 402 and the battery 404 both provide power to the load 110 (e.g., the loads 302a-n). For example, the load 110 can be concurrently powered with both the primary power source (e.g., the AC-DC converter 402) and the backup power source (e.g., the battery 404).

The amount of power delivered from the AC-DC converter 402 is limited by maximum allowable AC line current provided by the primary power source. Therefore, the remaining power delivered to the load 110 is delivered from the battery 404. For example, if the primary power source provides 80% of the power to the load 110, then the backup power source provides 20% of the power to the load 110. As such, the battery 404 delivers minimized power (e.g., low power) for a certain period of time. Therefore, the battery 404 is discharged at lighter load power (e.g., the battery 404 avoids being completely drained). At time B, the primary power source is restored to a normal level (e.g., the backup generator 104 provides AC power). Therefore, at time B, the battery 404 is immediately turned off (e.g., power from the battery 404 is not discharged). Additionally, the primary power source (e.g., the AC power source 102 or the backup generator 104) is restored without a significant load step (e.g., 80% to 100% load step). Therefore, the backup power source is turned off without disrupting AC power to the load 110 (e.g., degrading the AC power signal).

Figure 8:
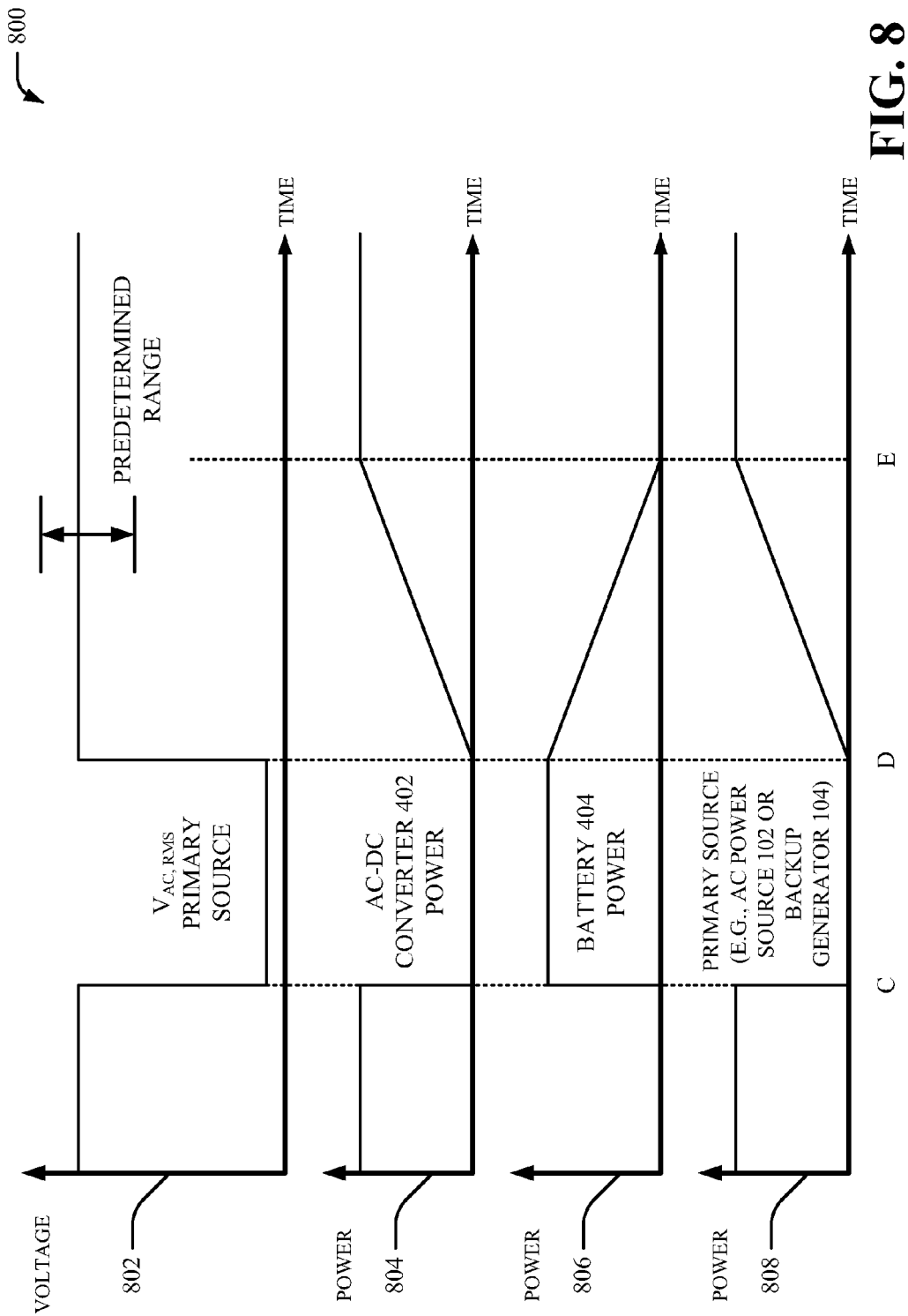
FIG. 8 illustrates another non-limiting waveform for a power source system that provides alternating current power control.

Referring now to FIG. 8, there is illustrated another non-limiting waveform 800 for a system with AC power control. The waveform 800 includes a waveform 802, a waveform 804, a waveform 806 and a waveform 808. The waveform 802 illustrates a voltage level (e.g., RMS voltage level) provided by the primary power source (e.g., the AC power source 102 or the backup generator 104). The waveform 804 illustrates a power level provided by the AC-DC converter 402. The waveform 806 illustrates a power level provided by the battery 404. The waveform 808 illustrates a power level provided by the primary power source (e.g., the AC power source 102 or the backup generator 104).

The control component 112 controls the AC-DC converter 402 and the battery 404. Before time C, the voltage provided by the primary power source is within the predetermined range. Therefore, the primary power source (e.g., the AC power source 102) provides power the load 110. At time C, the voltage provided by the primary power source drops below the lower threshold of the predetermined range. For example, the AC power from the primary source can drop to zero, or nearly to zero. Therefore, at time C, power to the load 110 is exclusively (e.g., completely) delivered by the battery 404.

At time D, AC power from the primary source is restored (e.g., the backup generator provides AC power). As such, the output power from the AC-DC converter 402 is slowly increased to softly start the primary source (e.g., provide a soft start condition). The remaining power is delivered from the battery 404. Therefore, the ramp up rate of the AC-DC converter 402 and/or the ramp down rate of the battery 404 is controlled by the control component 112 (e.g., the ramp control component 604) when AC power from the primary source returns. For example, the ramp up rate of the AC-DC converter 402 can be inversely proportional to the ramp down rate of the battery 404. The ramp up rate of the AC-DC converter 402 and/or the ramp down rate of the battery 404 is controlled by the control component 112 until the power level of the primary power source returns to a normal level (e.g., a power level before time C). As such, the backup generator 104 is turned on without stalling and/or turning off (e.g., the backup generator 104 implements a soft start). At time E, power to the load 110 is exclusively (e.g., completely) delivered by the AC-DC converter 402.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 9:
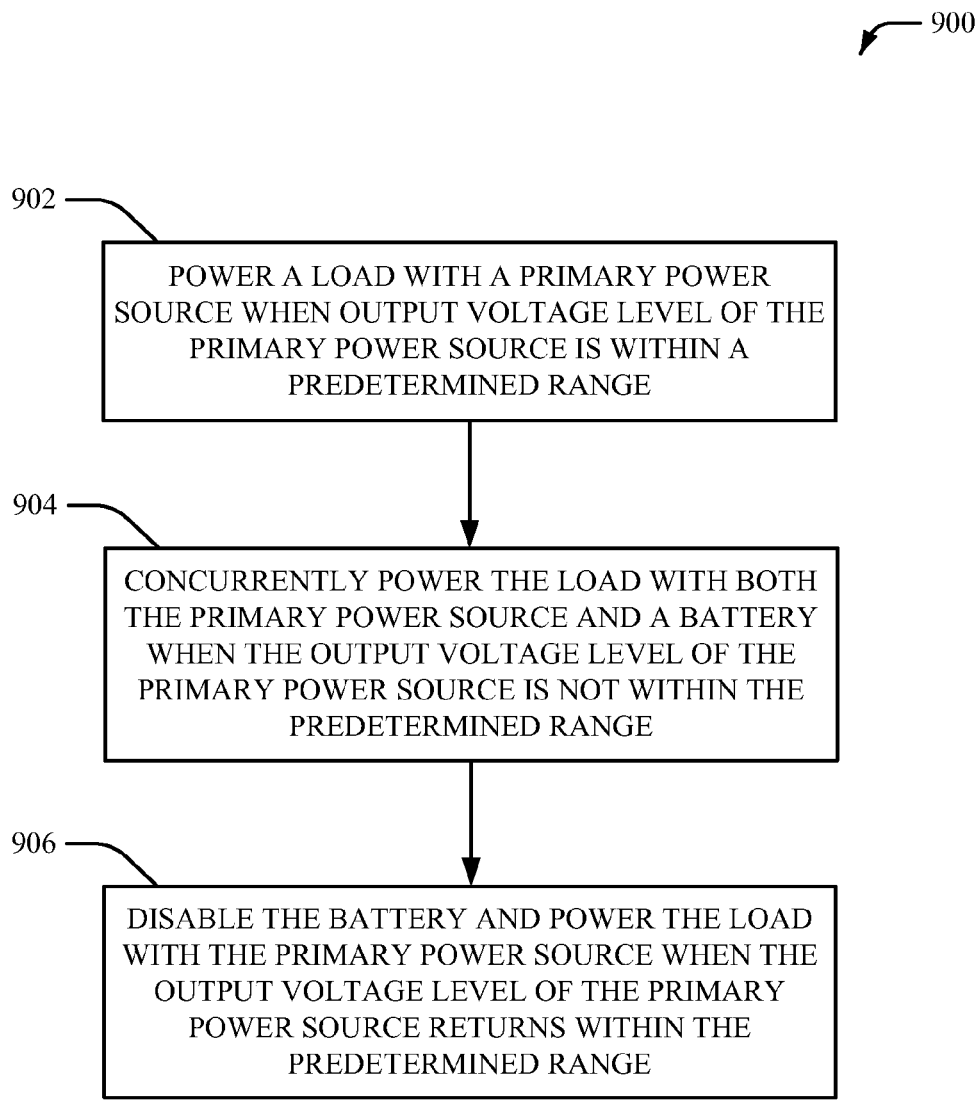
FIG. 9 is an exemplary non-limiting flow diagram for providing alternating current power control in a power source system.

Referring to FIG. 9, there illustrated is a methodology 900 for implementing AC power control in a power supply system, according to an aspect of the subject innovation. As an example, methodology 900 can be utilized in various systems, such as, but not limited to, data center systems, network systems, computer network systems, communication systems, router systems, data center systems, server systems, high availability server systems (e.g., Telecom server systems), Web server systems, file server systems, media server systems, disk arrays, powered insertion boards, etc. Moreover, the power supply system with AC power control is configured to control the amount of power supplied to one or more loads from a primary power source and a backup power source. Specifically, methodology 900 enables a primary power source and a backup power source to concurrently provide controlled power to one or more loads.

Initially, the AC power source or the backup generator is switched on and/or connected to the transfer switch. Additionally, the transfer switch is connected to the power supply and the power supply is connected to the load. At 902, a load is powered with a primary power source (e.g., an AC power source 102) when output voltage level of the primary power source is within a predetermined range. For example, the load 110 (e.g., the loads 302a-n) can be powered with a primary AC power source via the AC-DC converter 402 when the voltage level of the primary power source is within a predetermined range. At 904, the load is concurrently powered with both the primary power source and a battery (e.g. a battery 404) when the output voltage level of the primary power source is not within the predetermined range. For example, the battery 404 can provide a portion of power to the load 110 (e.g., the loads 302a-n) not provided by the primary power source. At 906, the battery is disabled and the load is powered with the primary power source (e.g., a backup generator 104) when the output voltage level of the primary power source returns within the predetermined range. For example, the battery 404 can be immediately disabled when the output voltage level of the primary power source reaches a lower threshold level of the predetermined range.

Figure 10:
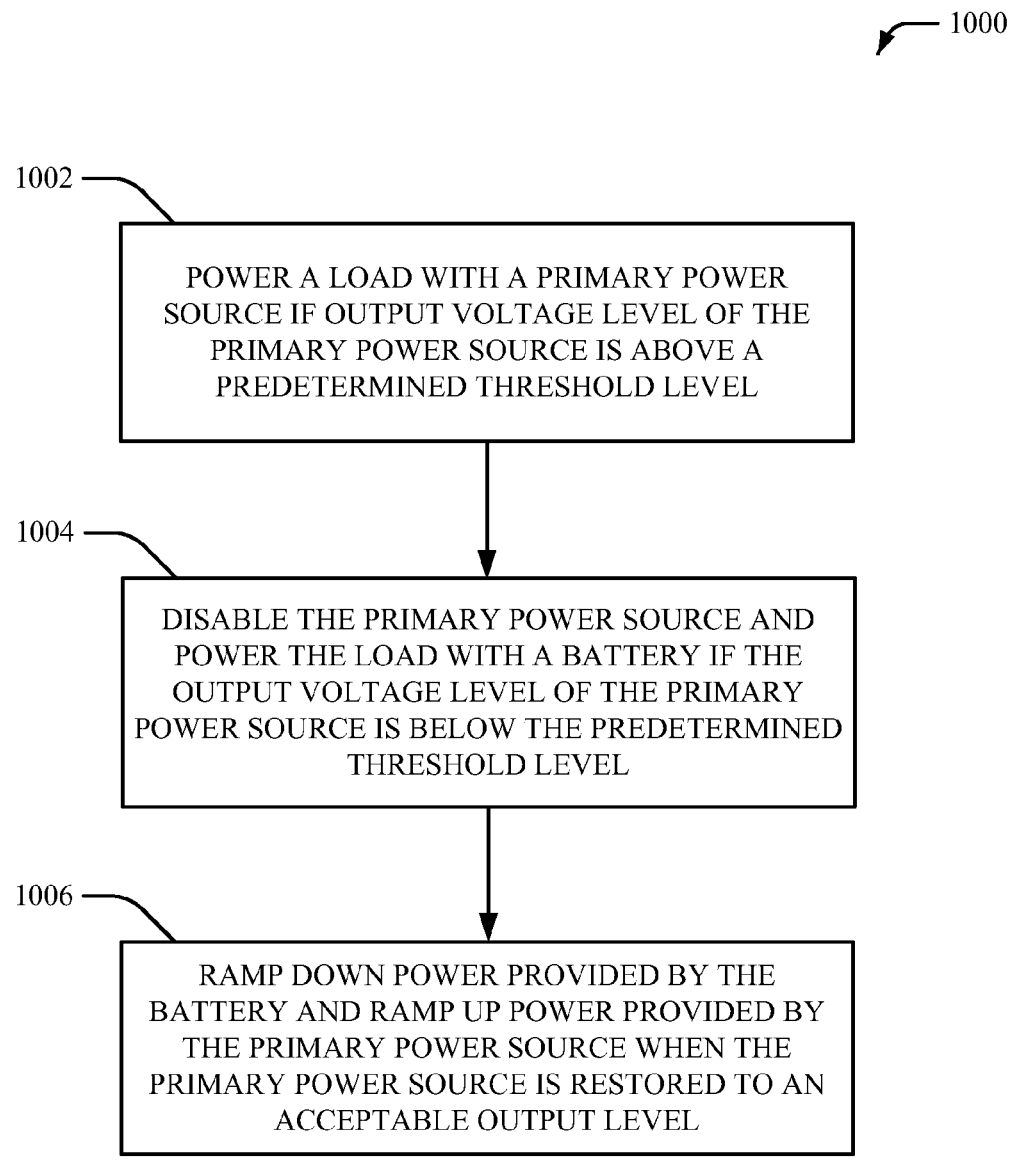
FIG. 10 is another exemplary non-limiting flow diagram for providing alternating current power control in a power source system.

Referring to FIG. 10, there illustrated is a methodology 1000 for providing AC power control in a power supply system, according to another aspect of the subject innovation. At 1002, a load is powered with a primary power source (e.g., an AC power source 102) if output voltage level of the primary power source is above a predetermined threshold level. For example, the predetermined threshold level can be a threshold level lower than the predetermined range for the output voltage level of the primary power source. At 1004, the primary power source is disabled and the load is powered with a battery (e.g., a battery 404) if the output voltage level of the primary power source is below the predetermined threshold level. At 1006, power provided by the battery is ramped down (e.g., using a control component 112) and power provided by the primary power source is ramped up (e.g., using a control component 112) when the primary power source is restored to an acceptable output level. For example, power provided the battery 404 can be ramped down and power provided by the backup generator 104 can be ramped up when the backup generator 104 begins to provide AC power.

Figure 11:
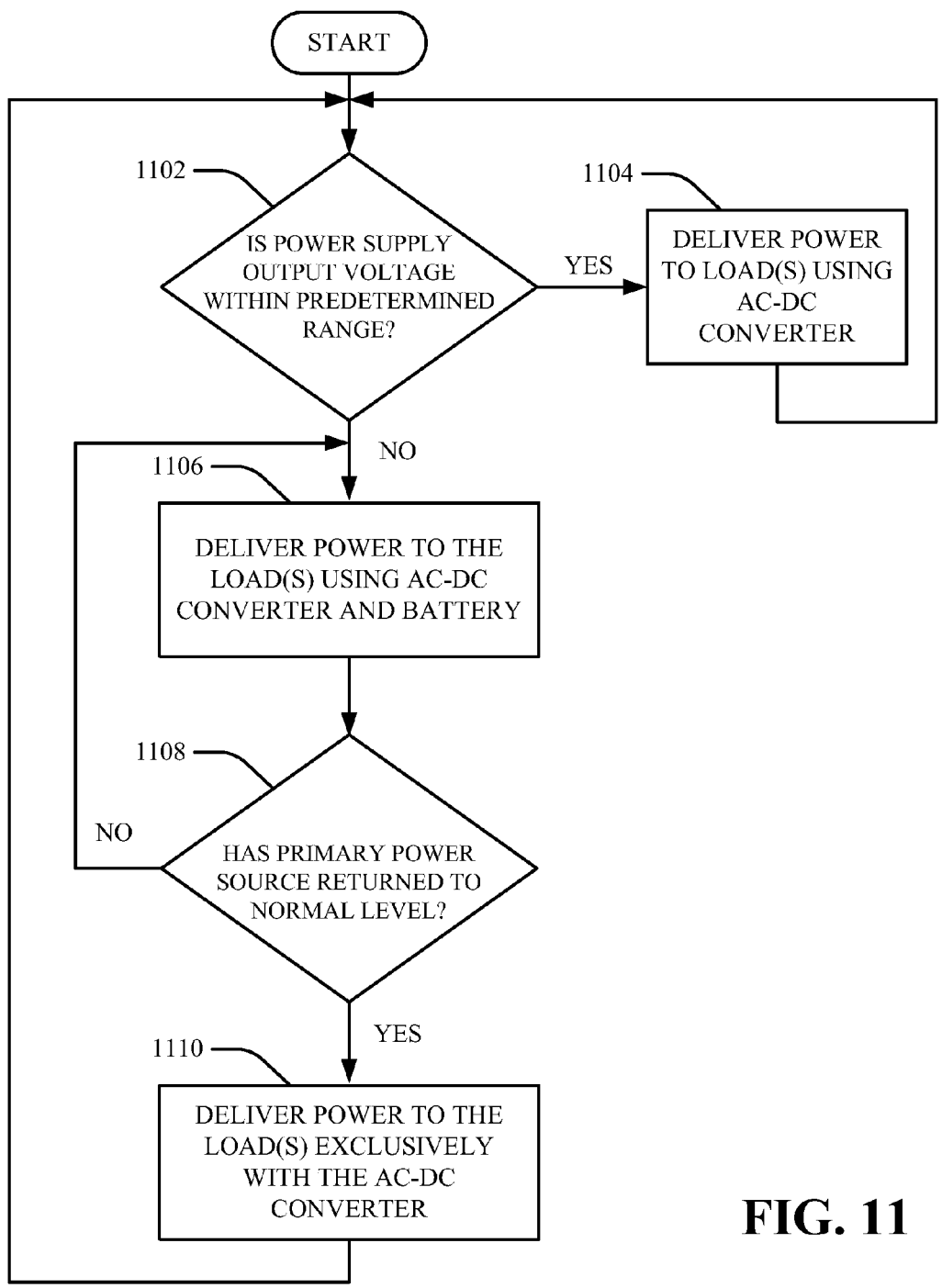
FIG. 11 is an exemplary non-limiting flow diagram for providing alternating current power control in a power source system based on a voltage level of a primary power source.

Referring to FIG. 11, there illustrated is a methodology 1100 for providing AC power control in a power supply system based on a voltage level of a primary power source, according to an aspect of the subject innovation. At 1102, it is determined (e.g., using a control component 112) whether a power supply output voltage is within a predetermined range.

If yes, at 1104, power is delivered to one or more loads using an AC-DC converter (e.g., an AC-DC converter 402). If no, at 1106, power is delivered to the one or more loads using an AC-DC converter and a battery (e.g., a battery 404). At 1108, it is determined (e.g., using a control component 112) whether a primary power source has returned to a normal level. If no, the methodology 1100 returns to 1106. If yes, at 1110, power is delivered to the one or more loads exclusively with the AC-DC converter. Then, the methodology 1100 returns to 1102.

Figure 12:
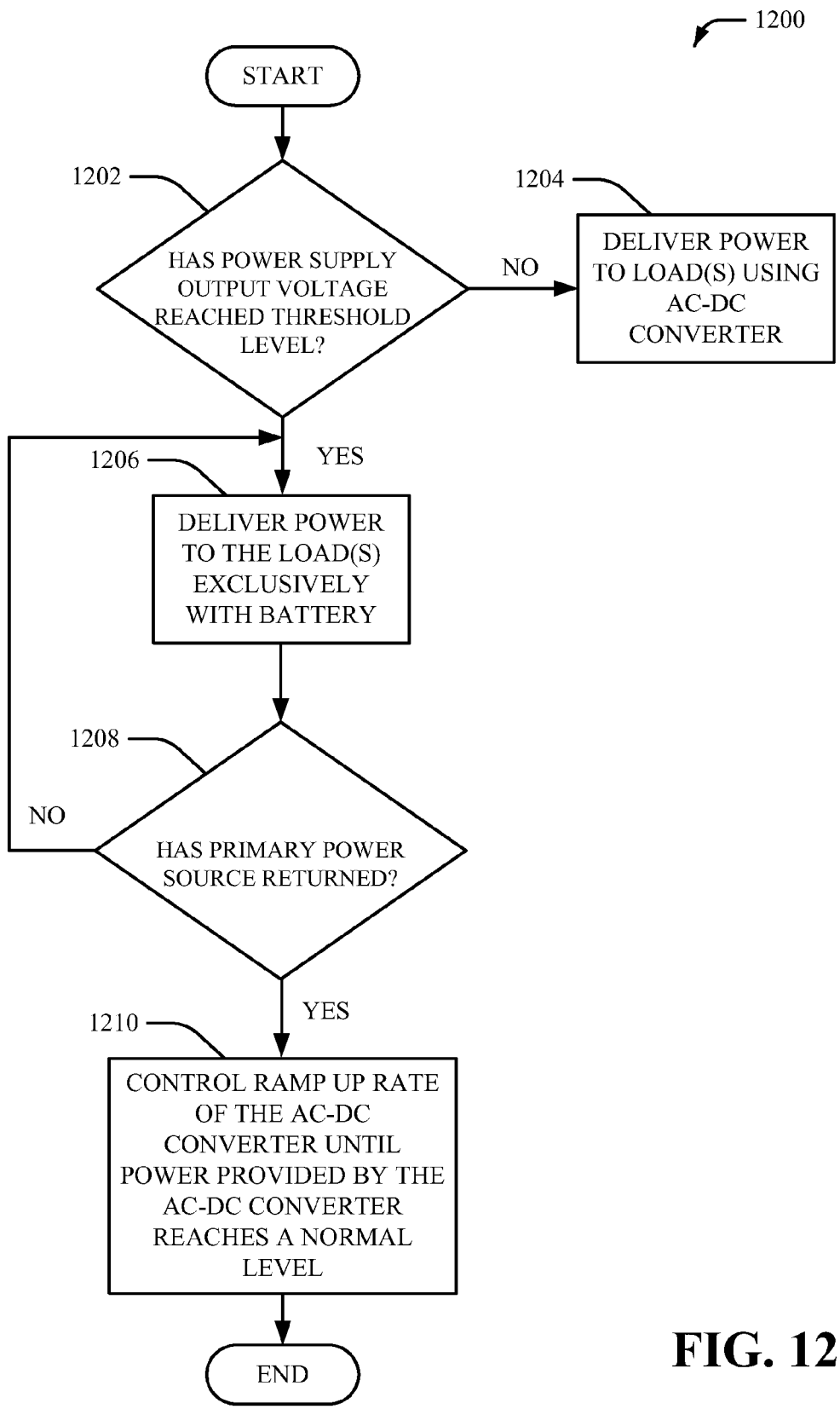
FIG. 12 is another exemplary non-limiting flow diagram for providing alternating current power control in a power source system based on a voltage level of a primary power source.

Referring to FIG. 12, there illustrated is a methodology 1200 for providing AC power control in a power supply system based on a voltage level of a primary power source, according to another aspect of the subject innovation. At 1202, it is determined (e.g., using an output control component 602) whether a power supply output voltage has reached a threshold level. If no, at 1204, power is delivered to one or more loads using an AC-DC converter (e.g., an AC-DC converter 402). If yes, at 1206, power is delivered to the one or more loads exclusively with a battery (e.g., a battery 404). At 1208, it is determined (e.g., using an output control component 602) whether a primary power source has returned. If no, methodology 1200 returns to 1206. If yes, at 1210, ramp up rate of the AC-DC converter is controlled (e.g., using a ramp control component 604) until power provided by the AC-DC converter reaches a normal level.

What has been described above includes examples of the implementations of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

In regards to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A power system, comprising:
   a primary power source;
   a backup power source; and
   a control component that powers a load with the primary power source, wherein the control component is configured to:
  disable the primary power source and enable the backup power source to power the load with the backup power source upon detecting a fault condition at the primary power source;
  determine that an output voltage of the primary power source is restored and that the output voltage is capable of independently powering the load;
  re-enable the primary power source to power the load simultaneously with power from the backup power source and power from the primary power source, each capable of independently powering the load and each simultaneously coupled to the load, wherein the control component limits the power from the primary power source that is provided to the load to less than an amount of power required to independently power the load;
  while the primary power source and the backup power source are both coupled to power the load, ramp up the power provided to the load by the primary power source to a predetermined threshold while simultaneously ramping down the power provided to the load by the backup power source; and
  disable the backup power source when the ramp up of the power provided by the primary power source reaches the amount of power required to independently power the load.

2. The power system of claim 1, wherein the fault condition includes a primary source voltage level below a predetermined threshold.

3. The power system of claim 2, wherein the predetermined threshold includes a root mean square (RMS) voltage value.

4. The power system of claim 1, wherein the ramp down rate of power provided by the backup power source is inversely proportional to the ramp up rate of power provided by the primary power source.

5. A power system, comprising:
  a primary power source;
  a backup power source; and
  a control component that powers a load with the primary power source if output voltage of the primary power source is above a predetermined threshold,
  wherein the control component is configured to:
    determine that an output voltage of the primary power source is above the predetermined threshold and that the output voltage is capable of independently powering the load;
    re-enable the primary power source to power the load simultaneously with both the primary power source and the backup power source, each capable of independently powering the load and each simultaneously coupled to the load, wherein the control component limits the power from the primary power source that is provided to the load to less than an amount of power required to independently power the load;
    while the primary power source and the backup power source are both coupled to the load, ramp up the power provided to the load by the primary power source while simultaneously ramping down the power provided to the load by the backup power source; and
  disable the backup power source when the ramp up of the output voltage of the primary power source rises to or above the predetermined threshold.

6. The power system of claim 5, wherein the backup power source includes a battery.

7. The power system of claim 5, further comprising power converters for the backup power source and the primary power source respectively, which are situated in a single power supply housing.

8. The power system of claim 5, further comprising:
  a converter component coupled to the primary power source and the load, wherein the converter component is configured to provide the power generated by the primary power source to the load.

9. The power system of claim 8, wherein the power provided by the converter component to the load is limited by line current of the primary power source.

10. The power system of claim 5, further comprising:
  an alternate primary power source and an alternate backup power source that are configured to power the load.

11. The power system of claim 10, wherein the primary power source, the backup power source, the alternate primary power source and the alternate backup power source simultaneously power the load.

12. The power system of claim 10, wherein the alternate primary power source and the alternate backup power source are configured to power an alternate load.

13. The power system of claim 10, wherein the control component is configured to control the alternate primary power source and the alternate backup power source.

14. The power system of claim 5, wherein the primary power source includes one of an AC utility line or an AC generator.

15. The power system of claim 14, further comprising: a transfer switch configured to selectively couple the load to either the AC utility line or the AC backup generator.

16. The power system of claim 5, wherein the predetermined threshold includes a root mean square (RMS) voltage value.

17. A method, comprising:
  powering a load with a primary power source when output voltage level of the primary power source is above a predetermined threshold;
  determining that an output voltage of the primary power source is below the predetermined threshold;
  re-enabling the primary power source to power the load simultaneously with both the primary power source and a backup power source, each capable of independently powering the load and each simultaneously coupled to the load;
  while the primary power source and the backup power source are both coupled to the load, ramping up the power provided to the load by the primary power source to a predetermined threshold while simultaneously ramping down the power provided to the load by the backup power source; and
  disabling the backup power source and powering the load with the primary power source when the output voltage level of the primary power source rises above the predetermined threshold.

18. A method, comprising:
  powering a load with a primary power source;
  powering the load with a backup power source and disabling the primary power source upon detecting a fault condition at the primary power source;
  determining that an output voltage of the primary power source is restored and that the output voltage is capable of independently powering the load;
  enabling the primary power source, to power the load simultaneously with power from the backup power source and power from the primary power source, each capable of independently powering the load and each simultaneously coupled to the load, wherein a control component limits the power from the primary power source that is provided to the load to less than an amount of power required to independently power the load;

while the primary power source and the backup power source are both coupled to the load, ramping down power provided by the backup power source to a predetermined threshold while simultaneously ramping up power provided by the primary power source; and disabling the backup power source when ramp up of the power provided by the primary power source reaches the amount of power required to independently power the load.

19. The method of claim 18, wherein ramping down the power provided by the backup power source occurs at a rate inversely proportional to the rate of ramping up the power provided by the primary power source.

* * * * *